3,307,543
COVER FOR A RESPIRATOR FILTER HOLDER
Leslie Silverman, Dover, Mass., assignor to Welsh Manufacturing Company, a corporation of Rhode Island
Filed Oct. 26, 1964, Ser. No. 406,290
4 Claims. (Cl. 128—146.4)

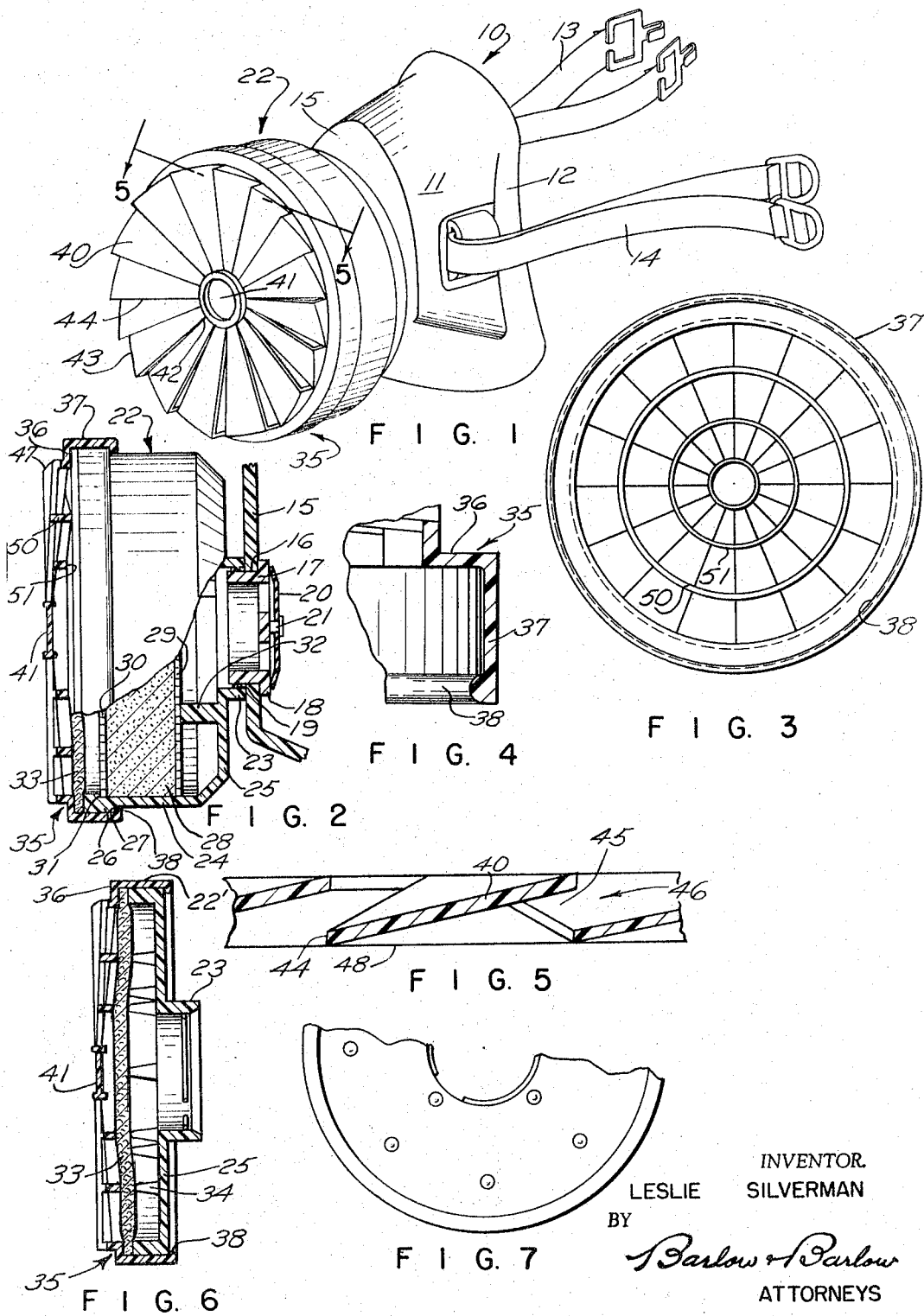

This invention relates to a respirator and more particularly to a filter holder therefor.

Heretofore, respirator cartridges have been in the form of a casing containing some filtering material with one wall or a cover of the unit filter holder being perforated for the admission of air which would contact the surface of the filter to deposit any particles carried by the air on the filter as the air passes through the filter. In the use of a cover so perforated, air which is heavy laden with particles soon deposited the particles carried in the air upon the filter and clogged the filter so that it had to be changed or cleaned in some way.

One of the objects of this invention is to provide a cover which will deflect a large part of the air which is so heavy laden with particles that the particles will be deposited upon the outer surface of the cover rather than upon the filter while the air passes on and thus cause the filter to be of longer life.

Another object of the invention is to provide a cover which will have openings through which the air may pass but which will receive deflected air so that the main movement of air toward the cartridge will impinge upon the wall of the cover and thereafter be deflected to pass through the openings in the cover to pass through the filter.

Another object of the invention is to prevent restriction of openings in the cover by the filter by spacing the filter from the cover and the openings therein.

Another object of this invention is to provide a cover which may be easily removed for replacing the filter as occasion may desire.

Another object of the invention is to provide a comparatively large opening for access to the filter and yet a shield for the particles carried by the air which may be passed through the filter.

With these and other objects in view, the invention consists of certain novel features of construction as will be more fully described and particularly pointed out in the appended claims.

In the accompanying drawings:

FIG. 1 is a perspective view of a respirator equipped with a filter holder embodying this invention;

FIG. 2 is a side elevation showing partly in section the filter holder and the respirator with the cover for the holder in section;

FIG. 3 is a rear view of the cover;

FIG. 4 is a fragmental sectional view of a part of the cover for the filter holder on a greatly enlarged scale;

FIG. 5 is a fragmental view in section on substantially line 5—5 of FIG. 1;

FIG. 6 is a sectional view of a modified form of filter holder; and

FIG. 7 is a plan view of a fragmental portion of the filter holder of FIG. 6 with the cover removed.

In proceeding with this invention, I have provided a filter holder which may be detachably secured to the body portion of a respirator and which holder will have a removable cover which is provided with louvers extending radially from a central portion of the cover so that particles in the air which are directed at right angles to the general plane of the cover will impinge against the outer surface of the cover and there be collected, the filter being particularly adapted for use in the area of air laden with paint, such as paint in sprayed form which quickly clogs a filter. My arrangement is such that paint is collected on the outer surface of the cover, while the air is deflected at an angle to the plane of the cover to pass through the openings provided by the louvers and thereafter contact the filter throughout substantially 100% of the area of the filter by reason of ribs on the cover holding the filter spaced from the cover to prevent it from restricting the passage of air over the surface of the filter.

With reference to the drawings, 10 designates generally the respirator which has a flexible side wall 11 having a peripheral edge 12 which is shaped to generally conform to the face of the user and which is sufficiently flexible to snugly engage and seal with the face of the user, the seal being provided by drawing the respirator toward the face by means of elastic straps 13 and 14 on either side of the body of the respirator which extend about the head of the user. The front wall 15 of this body 11 is provided with an opening such as shown in FIG. 2 at 16, and through this opening there is an open ended tubular member 17 flanged as at 18 to engage the inner surface of the wall 15 and threaded on its outer surface as at 19. An inhalation valve 20 is secured by a headed boutton 21 and serves to control the movement of the air into the body while preventing exhalation at this point. The cartridge 22 which attaches to the body 10 and more particularly to the tubular member 17 thereof is provided with a neck portion 23 having threads to engage the threads 19 of this tubular member 17 and provide a tight fit to the body.

The cartridge 22 comprises a casing having a side wall 24 and a bottom wall 25, the side wall being provided with a bead on its outer surface adjacent its entrance end as at 26 so as to provide a shoulder 27. This cartridge may contain various types of filtering materials such as, for instance, a granular-like depth filter 28 held in place by perforated plates 29 and 30, the former resting on posts 32 and the latter engaging the inturned edge 31. A sheet-like filter 33 of felt or the like extends over the plate 30 engaging the edges of the cartridge 22 which is held in position spaced from plate 30 by the cover 35.

In other instances such as shown in FIG. 6, the sheet-like filter material 33 is held in spaced relation to the bottom wall 25 by projections 34 of a more shallow filter holder 22′, thus leaving a passage for air between the filter 33 and the wall 25 to the neck 23 while the cover 35 holds the filter sheet 33 in place. In this case the filter holder is of much thinner depth than the cartridge 22 and has no loose or depth type filter material therein.

For either cartridge 22 or filter holder 22′ I utilize a cover 35 which comprises a front wall 36 and a flange 37, which flange will have a bead as at 38 (FIG. 4) which may be resiliently expanded to pass over and grip beneath the shoulder 27 of the cartridge 22 or beneath the bottom wall 25 of the filter holder 22′. The cover 35 is generally circular in shape, and just inwardly from its circular peripheral edge, I provide a plurality of louvers 40 which radiate from the center 41 of this cover. These louvers 40 thus each increase in width as they extend outwardly from a point 42 adjacent the center to the point 43 adjacent the outer peripheral edge, and each of these louvers may be angled outwardly such as by rotating about the radiating line 44 as a hinge axis as it progresses outwardly from the center 41, thus leaving an opening 45 for access of air along the line of arrow 46 (FIG. 5) beneath the louver and into the filter holder. The amount of the opening 45 may vary by the amount that the louver 40 is angled with respect to the hinge axis 44 about which it is swung. The opening 45 of the louver also increases in area as it extends from the center outwardly. Thus the outer edge such as 47 (FIG. 2) of each opening is a greater distance from the plane at right angles to the axis of the cartridge than is the edge of the louver adjacent the center 41. Thus, by such construction I provide an increasingly larger opening as the louver radiates from the center. The entire front wall is spaced from the filter material 33 by circular ribs 50 and 51 preventing the filter 33 from blocking the opening 45 (FIG. 5) which thus leaves substantially the entire area of the filter material exposed to the air which enters through the opening 45 formed by each of the louvers. There may be one rib or more than one. Each rib serves to also strengthen the louvered wall by tying the louvers together.

The amount of this opening 45 may be varied by varying the angle that the louver 40 extends to the plane 48 of the wall 36 as shown in FIG. 5 to the amount that I desire, and while I find that an opening having an area of 20% of the area encompassed by the louvers is very satisfactory, the amount of this opening may be varied from 10% to 30% of the area embraced by the louvers and still function in a desirable manner.

The use of this device in connection with a paint spray has been found to be very satisfactory in that the particles of paint in spray or mist form are found to collect upon the outer surface of the cover 35 while permitting the air to pass through the louvers and through the filter. The large collection of paint mist upon the outer surface of the cover indicates that as the air is drawn toward the cover at approximately right angles to the surface of the cover by breathing, the paint particles will collect on this cover and while there collected will not serve to clog the surface of the filter 33 which will thus have a much longer life.

I claim:

1. In a respirator, a filter holder comprising a body, a filter within the body, a wall attached to the body, said wall being provided with a plurality of louvers radiating from a common center and arranged in an echelon relation circularly about said center and a circular rib intermediate the ends of said louvers carried by said wall and of a dimension extending beyond the inner edges of the louvers and spacing the filter from said wall.

2. In a respirator, a filter holder as in claim 1 wherein the wall is generally in a plane with the portion thereof forming the louvers comprising a complete cover of the area at right angles to said plane with each louver being at an angle to said plane to form an opening providing access into the body at an angle to said plane.

3. In a respirator, a filter holder as in claim 2 wherein said opening is of an area of from 10% to 30% of the area embraced by the radiating louvers.

4. In a respirator, a filter holder as in claim 1 wherein there are interengaging means between said wall and body to provide a detachable connection between the two.

References Cited by the Examiner

UNITED STATES PATENTS 3,029,812   4/1962   Matheson _____ 128—146

FOREIGN PATENTS 5,655   1927   Australia.

RICHARD A. GAUDET, *Primary Examiner.*

K. T. HOWELL, *Assistant Examiner.*